Dec. 26, 1933.  H. R. ALLEN  1,941,136
LUBRICATION DEVICE
Original Filed July 29, 1932
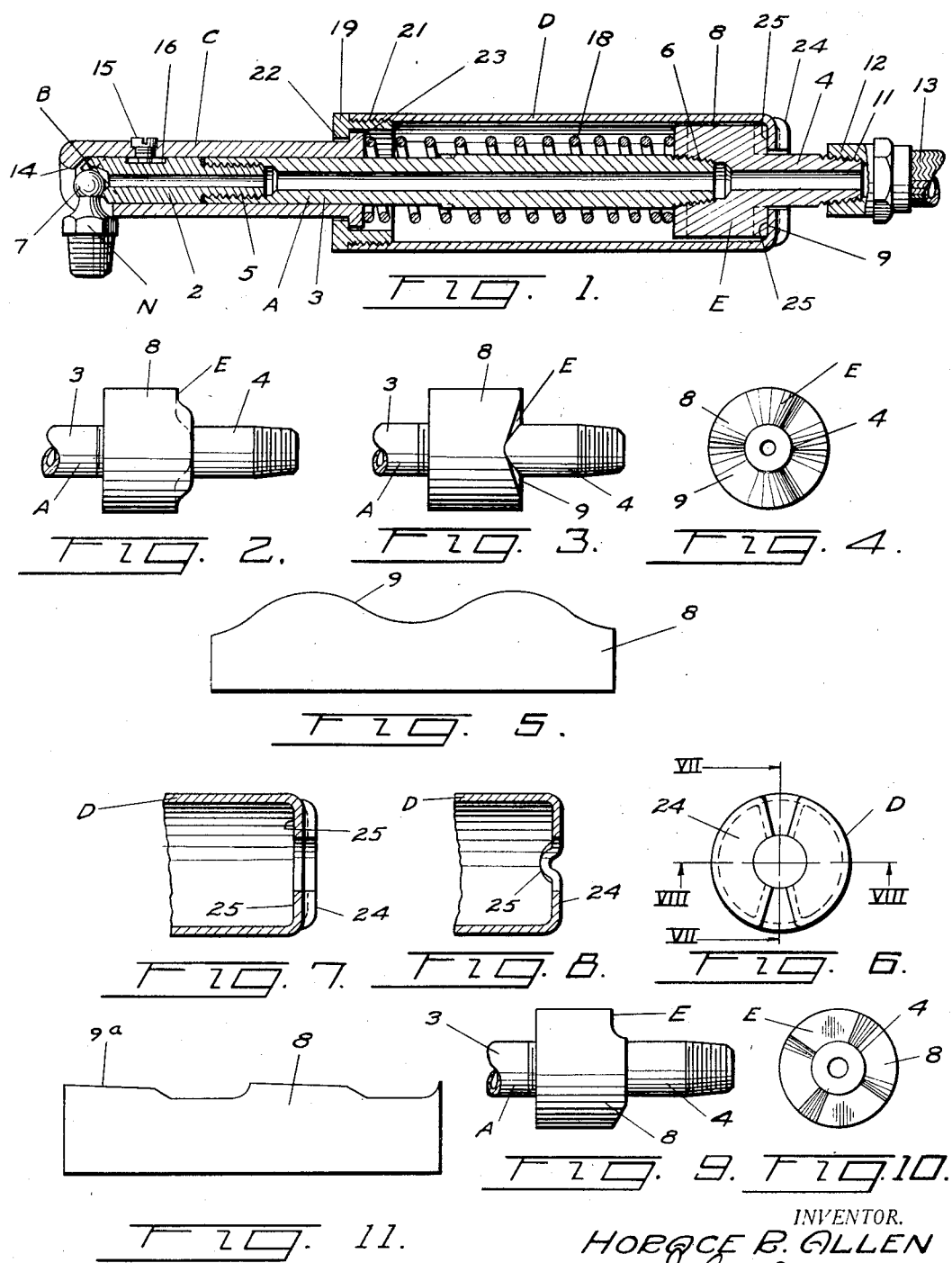
INVENTOR.
HORACE B. ALLEN
BY John A. Watson
ATTORNEY.

Patented Dec. 26, 1933

1,941,136

UNITED STATES PATENT OFFICE 1,941,136

LUBRICATION DEVICE

Horace R. Allen, South Bend, Ind., assignor to The Lubrication Corporation, South Bend, Ind., a corporation of Delaware Application July 29, 1932, Serial No. 628,196
Renewed October 28, 1933

10 Claims. (Cl. 285—143)

This invention relates to improvements in lubricating devices and more particularly to lubricant discharge nozzles of the mechanical clamp type.

It is desirable, when discharging lubricants under high pressures into lubricant receiving nipples or fittings, that some means be provided for clamping the discharge nozzle of the lubricant dispenser apparatus upon the nipple or fitting so that the nozzle may not be forced out of engagement therewith while under the influence of the lubricant pressure.

An object of the invention is to provide a manually operated clamp type discharge nozzle which may be quickly and easily clampingly engaged and disengaged to and from a lubricant receiving fitting.

Another object is to provide a clamp type discharge nozzle of the mechanical clamp type which has but few moving parts and wherein relatively high clamping pressure may be obtained with relatively slight manual effort.

Other objects, advantages and uses of the invention, will be apparent after reading the following description and claims and after consideration of the accompanying drawing forming a part of this specification, in which:

Fig. 1 is a sectional view illustrating a clamp type lubricant discharge nozzle constructed in accordance with the invention;

Fig. 2 is a side elevation of a part of the clamp operating cam mechanism;

Fig. 3 is a top plan view of the mechanism illustrated in Fig. 2;

Fig. 4 is an end elevation of the mechanism of Fig. 2;

Fig. 5 is a schematic view illustrating the development of the cam surface of the mechanism of Figs. 2 to 4 inclusive;

Fig. 6 is an end elevation of the manually operated clamp actuating sleeve;

Fig. 7 is a sectional view along the line VII—VII of Fig. 6;

Fig. 8 is a sectional view along the line VIII—VIII of Fig. 6;

Fig. 9 is a side elevation of another form of the cam mechanism illustrated in Fig. 2;

Fig. 10 is an end elevation of the mechanism of Fig. 9; and,

Fig. 11 is a schematic view illustrating the development of the cam surface of the mechanism of Figs. 9 and 10.

In general, the clamp type lubricant discharge nozzle selected for illustration herein comprises, a conduit A, having a discharge orifice B at one end thereof, a clamping member C slidably mounted on the conduit A for clamping said conduit upon the head of a lubricant receiving fitting N; a manually operable sleeve D rotatably mounted upon the conduit A, and cam mechanism E associated with the conduit and the sleeve D for causing relative movement between the clamping member and the conduit upon rotational movement of the sleeve D.

The conduit A is composed of three aligned sections 2, 3 and 4 respectively, secured together by cooperating right hand screw threads as shown at 5 and 6 respectively. The section 2 comprises the forward end of the conduit and includes the discharge orifice B, the walls of which are adapted to engage with the spherical head 7 of the fitting N to form a ring seal by contact therewith. The section 4 of the conduit comprises the rearward end thereof and is formed with a portion 8 of enlarged diameter, the end wall 9 of which is fashioned to provide an annular cam surface forming a part of the cam mechanism E. The rearmost end of the conduit section 4 is externally threaded at 11 for connection to the end fitting 12 of a flexible hose or conduit 13 through which lubricant under pressure may be admitted to the nozzle.

The clamping member C is substantially tubular in shape and is slidably mounted upon the forward end of the conduit with its clamping jaw 14 overhanging the discharge orifice B whereupon relative movement between the conduit and clamping members may function to clamp the head 7 of the fitting N therebetween at such times as when the discharge orifice B of the conduit is in registration therewith. Relative rotation between the clamping member C and the conduit A is prevented by a stud screw 15 extended through the side wall of the clamping member and into a slot or groove 16 formed in the outer wall of the conduit section 2, thereby maintaining proper registration between the clamping jaw 14 and the discharge orifice B. A compression spring 18 disposed about the conduit A is located between the adjacent ends of the clamping member C and the enlarged portion 8 of the conduit section 4 to urge, yieldingly, the clamping member and conduit to their unclamped positions.

The manually operable sleeve D is rotatably coupled at its forward end to the clamping member C through the medium of a bushing 19 secured within the inner end of the sleeve by cooperating screw threads 21 and provided with an inwardly extending lip 22 at its outer end engageable with the forward end wall of a flange 23 formed on the outer and rearward portion of the clamping member. The rearward portion of the sleeve D is rotatably mounted upon the enlarged portion 8 of the conduit section 4. The rearward end of the sleeve may be spun inwardly as shown at 24 and formed to provide a pair of diametrically opposed inwardly extending bosses 25 arranged to bear upon the cam surface 9 of the conduit section 4. Rotation of the sleeve D upon the conduit A will therefore cause the bossed portions 25 to travel about the cam surface 9. In Fig. 5 the development of the cam surface 9 is shown schematically to illustrate the uniform change in amplitude of the surfaces. This arrangement provides relative right line movement between the clamping member C and the conduit A in direct proportion to the degree of rotational movement of the sleeve D.

In operation, the discharge nozzle may be connected to a source of lubricant supply through the medium of a conduit or flexible hose as shown at 13. The operator may next move the nozzle to bring the discharge orifice B thereof into registration with the head 7 of the lubricant receiving fitting N. At this time the head 7 will be between the clamping jaw 14 and the walls of the discharge orifice B with the nozzle supported in the hand of the operator by grasping the walls of the sleeve D. Rotation of the sleeve D with the nozzle thus initially engaged with the fitting will cause the bosses 25 of the end wall of the sleeve D to ride over the cam surface 9 of the conduit section 4 to cause the clamping member C and conduit to be drawn toward one another, thereupon clamping the nozzle securely upon the head 7 of the fitting N.

It is advisable in clamping the nozzle upon the fitting head to rotate the sleeve D to the right as held in the operator's hand so as not to apply torque through the conduit sections through friction between the bosses 25 on the sleeve and the cam surface which might result in loosening the threaded connections 5 and 6 between the conduit sections 2, 3 and 4. In like manner, the nozzle may be detached from the fitting by manual rotation of the sleeve D in the reverse direction.

In Figs. 9 to 11, inclusive, another form of the cam mechanism E is illustrated wherein, as may be seen in Fig. 11, the cam surface 9a is of variable pitch so as to first cause a considerable movement of the clamping member C relative to the conduit and thereafter gradual and slight relative movement, upon uniform rotation of the sleeve D. The cam mechanism E thus functions as a variable force multiplying instrumentality acting first to bring the clamping jaw toward the fitting head at an increased rate of travel and thereafter to decrease the rate of travel and greatly increase the force applied between the jaw and the conduit.

It is to be understood that the described embodiments of the invention herein set forth are presented for the purpose of illustration only, and various changes may be made therein without departing from the spirit and scope of the invention.

I claim:

1. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, and a manually operable sleeve rotatably mounted upon said clamping member at one end and upon said conduit at its other end, said conduit and said sleeve having contacting cam and cam riding surfaces respectively lying in planes substantially perpendicular to the axis of said conduit whereby rotation of said sleeve may cause relative longitudinal movement between said conduit and said clamping member.

2. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, a manually operable sleeve rotatably mounted upon said clamping member at one end and upon said conduit at its other end, said conduit and said sleeve having contacting cam and cam riding surfaces respectively lying in planes substantially perpendicular to the axis of said conduit whereby rotation of said sleeve may cause relative longitudinal movement between said conduit and said clamping member, and a compression spring disposed within said sleeve and bearing at opposite ends upon said clamping member and said conduit respectively.

3. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, and a manually operable sleeve rotatably mounted upon said clamping member at one end and upon said conduit at its other end, said conduit and said sleeve having contacting cam and cam riding surfaces respectively extending radially from the axis of said conduit whereby rotation of said sleeve may cause relative longitudinal movement between said conduit and said clamping member.

4. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, a manually operable sleeve rotatably mounted upon said clamping member at one end and upon said conduit at its other end, said conduit and said sleeve having contacting cam and cam riding surfaces respectively extending radially from the axis of said conduit whereby rotation of said sleeve may cause relative longitudinal movement between said conduit and said clamping member, and means for restraining said clamping member against rotation relative to said conduit.

5. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, said clamping member having an annular flange at its rearward end, a manually operable sleeve having one end rotatably mounted on said clamping member forwardly of said flange and engaged with the side wall of the flange and its other end rotatably mounted on said conduit, said conduit including a member providing a cam surface, said sleeve having a portion at its rearward end engageable with said cam surface whereby rotational movement of said sleeve may cause relative movement between said conduit and said clamping member.

6. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, said clamping member having an annular flange at its rearward end, a manually operable sleeve having one end rotatably mounted on said clamping member forwardly of said flange and engaged with the side wall of the flange and its other end rotatably mounted on said conduit, said conduit including a member providing a variable cam surface, said sleeve having a portion at its rearward end engageable with said variable cam surface whereby rotational movement of said sleeve may cause relative movement between said conduit and said clamping member.

7. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, said clamping member having an annular flange at its rearward end, a manually operable sleeve having one end rotatably mounted on said clamping member forwardly of said flange and engaged with the side wall of the flange and its other end rotatably mounted on said conduit, said conduit including a member providing a cam surface extending radially from the outer wall of said conduit, said sleeve having a portion at its rearward end engageable with said cam surface whereby rotational movement of said sleeve may cause relative movement between said conduit and said clamping member.

8. A lubricant discharge nozzle comprising, a conduit having a discharge orifice at its outer end and adapted for connection at its rearward end to a source of lubricant supply, a clamping member slidably mounted on said conduit for clamping engagement with a lubricant receiving fitting with which said discharge orifice of the conduit may be registered, and a manually operable sleeve rotatably mounted upon said clamping member at one end and upon said conduit at its other end, said conduit and said sleeve having contacting variable cam and cam riding surfaces respectively, lying in planes substantially perpendicular to the axis of said conduit whereby rotation of said sleeve may cause relative longitudinal movement between said conduit and said clamping member.

9. In a clamp type lubrication coupler, a nozzle member having a discharge orifice at one end and adapted for connection with a source of lubricant supply at its other end, a shoulder on said nozzle member adjacent to its said other end, a clamp member mounted on the discharge orifice end of said nozzle member for relative sliding movements longitudinally thereof, a sleeve at one end rotatably secured to said clamp member and at its other end having rotatable engagement with said shoulder, and cooperative cam means on the engaging portions of said shoulder and said sleeve for moving said nozzle and clamp members relatively longitudinally of one another upon a rotational movement of said sleeve.

10. In a clamp type lubrication coupler, a nozzle member having a discharge orifice at one end and adapted for connection with a source of lubricant supply at its other end, an annular shoulder on said nozzle member substantially perpendicular to the axis thereof and adjacent to its said other end, a clamp member mounted on the discharge orifice end of said nozzle member for relative sliding movements longitudinally thereof, a sleeve at one end secured to said clamp member for oscillations relative thereto and at its other end having oscillatable engagement with said shoulder, and cooperative cam means on the engaging portions of said shoulder and said sleeve for moving said nozzle and clamp members relatively longitudinally of one another upon an oscillation of said sleeve.

HORACE R. ALLEN.